A. F. BRODERICK.
LOCKING DEVICE FOR AUTOMOBILES.
APPLICATION FILED APR. 3, 1920.

1,376,999.

Patented May 3, 1921.

Inventor
Arthur F. Broderick
By his Attorney
Frank M. Ashley

UNITED STATES PATENT OFFICE.

ARTHUR F. BRODERICK, OF JERSEY CITY, NEW JERSEY.

LOCKING DEVICE FOR AUTOMOBILES.

1,376,999.    Specification of Letters Patent.    Patented May 3, 1921.

Application filed April 3, 1920. Serial No. 370,948.

*To all whom it may concern:*

Be it known that I, ARTHUR F. BRODERICK, a citizen of the United States, and resident of Jersey City, in the county of Hudson and State of New Jersey, have invented certain new and useful Improvements in Locking Devices for Automobiles, of which the following is a specification.

My invention relates to locking devices embodying means for preventing automobiles from being propelled when the coöperating parts are in locked relation.

The object of my invention is to provide means for locking a relatively stationary part of the construction to a part that moves when the vehicle is driven. My invention embodies a key actuated lock by means of which locking members may be placed in locked or unlocked relation.

Figure 1:
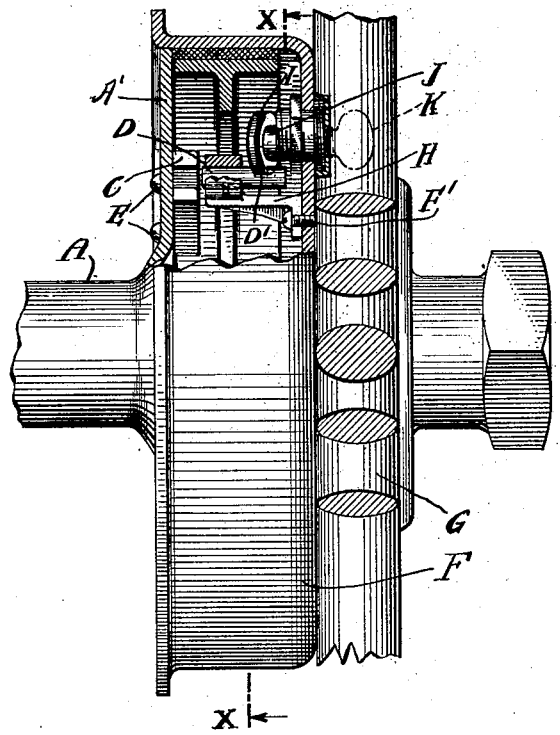

Referring to the drawings which form a part of this specification:

Figure 1. is a view of a brake drum, wheel, and housing, shown partly in section and disclosing the means employed to lock the drum and axle housing of an automobile together.

Figure 2:
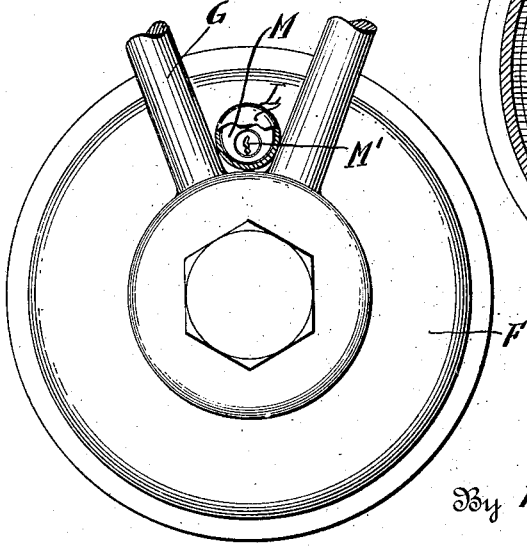

Fig. 2. is a side view disclosing the face of the lock and side of the drum.

Figure 3:
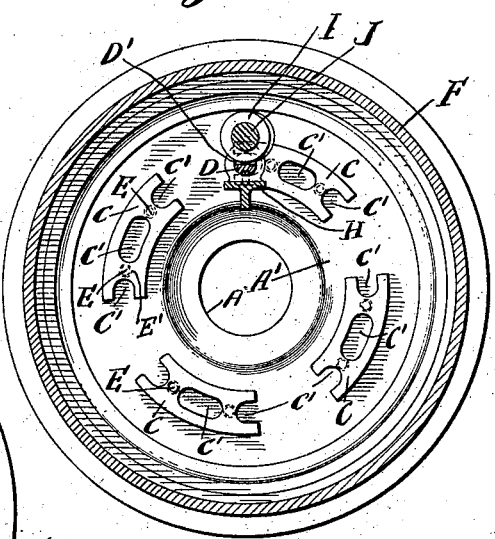

Fig. 3. is a side sectional view taken on line $x$—$x$ of Fig. 1.

A indicates the axle housing having a flange A' formed integral therewith on which is mounted a plurality of segments C—C—C—C arranged to form a circle, and constituting a ring in which are formed recesses C'—C', etc., to receive the end of the locking-bolt D. These segments are held to the flange A' by screws E—E, etc., which extend through the flange and segments and are upset at their inner ends E' to prevent their being unscrewed. These segments may, however, be fastened to the said flange in any other suitable manner. F indicates the brake-drum which is secured to the wheel G in the usual manner. A bracket H is secured to the inner side of the drum F by screws F', and carried by this bracket and in position to engage with the recesses C' is the bolt D which is actuated by the disk I, the periphery of which rests in a slot D' formed in the bolt D. The disk I is mounted on the end of a rod J with its sides set at an angle to the axis of said rod, and therefore, when the rod J is rotated in one direction on its axis the bolt is driven in one direction and vice versa, to lock or unlock the relative parts. A lock of the character of a Yale lock is preferred for operating the disk I, the key of which is indicated by K. A cap L is screwed over the end M of the lock when the automobile is driven, to prevent dirt from entering the key-hole M'. The construction is simple and effective. It will be understood that details of construction may be changed without departing from the invention disclosed.

Having thus described my invention, I claim as new and desire to secure by Letters Patent:

1. In an automobile having an axle housing provided with a flange and a brake drum, coöperating means connected therewith comprising a lock mechanism adapted to be actuated by a key to lock said flange and brake-drum together.

2. A vehicle comprising an axle housing having a flange, a brake drum adjacent thereto, locking means located within said drum for connecting said drum and flange in locked relation.

3. A vehicle comprising an axle housing having a flange, a brake drum adjacent thereto, locking means located within said drum for connecting said drum and flange in locked relation and means for actuating said locking means.

4. A vehicle comprising an axle housing having a flange, a brake drum adjacent thereto, locking means located within said drum for connecting said drum and flange in locked relation comprising an element having recesses therein mounted on said flange and a bolt carried by said drum adapted to enter said recesses.

5. A vehicle comprising an axle housing having a flange, a brake drum adjacent thereto, locking means located within said drum for connecting said drum and flange in locked relation comprising an element having recesses therein mounted on said flange and a bolt carried by said drum adapted to enter said recesses and means comprising a key for actuating said locking means.

Signed at New York city, in the county of New York and State of New York this 8th day of March, A. D. 1920.

ARTHUR F. BRODERICK.